(12) United States Patent
Daimon et al.

(10) Patent No.: US 11,872,526 B2
(45) Date of Patent: Jan. 16, 2024

(54) ELECTROCHEMICAL HYDROGEN COMPRESSION SYSTEM

(71) Applicant: Honda Motor Co., Ltd., Tokyo (JP)

(72) Inventors: Hayato Daimon, Saitama (JP); Hiroshi Yoshimura, Saitama (JP); Naoki Mitsuta, Saitama (JP); Shuichiro Kojima, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 129 days.

(21) Appl. No.: 17/551,120

(22) Filed: Dec. 14, 2021

(65) Prior Publication Data

US 2022/0185665 A1 Jun. 16, 2022

(30) Foreign Application Priority Data

Dec. 15, 2020 (JP) ................................. 2020-207572
May 6, 2021 (JP) ................................. 2021-078698

(51) Int. Cl.
*B01D 53/32* (2006.01)
*C25B 1/02* (2006.01)
(Continued)

(52) U.S. Cl.
CPC .............. *B01D 53/326* (2013.01); *C01B 3/38* (2013.01); *C25B 1/02* (2013.01); *B01D 2256/16* (2013.01); *C01B 3/56* (2013.01)

(58) Field of Classification Search
CPC .. C25B 1/02; C25B 1/04; F04B 43/04; B01D 53/326
See application file for complete search history.

(56) References Cited

U.S. PATENT DOCUMENTS 11,192,064 B2 * 12/2021 Zhang .................. C25B 15/021
2003/0062268 A1 4/2003 Kosek et al.

FOREIGN PATENT DOCUMENTS

CN 108875166 11/2018
JP 2008103137 5/2008
(Continued)

OTHER PUBLICATIONS

WO 2016063647 A1—see translation (Year: 2016).*
Office Action of Japan Counterpart Application, with English translation thereof, dated Jan. 31, 2023, pp. 1-6.

Primary Examiner — Nicholas A Smith
(74) Attorney, Agent, or Firm — JCIPRNET

(57) ABSTRACT

An electrochemical hydrogen compression system includes a hydrogen gas compression part that compresses hydrogen by applying a current between an anode and a cathode provided on two surfaces of a proton exchange film, and a supply pipeline that guides hydrogen discharged from a hydrogen supply source to the hydrogen gas compression part. The hydrogen gas compression part has an outlet for discharging unreacted hydrogen. The electrochemical hydrogen compression system further includes a film resistance meter and a voltmeter that acquire information related to a wet state of the proton exchange film, a fourth opening/closing part and a fifth opening/closing part that regulate discharge of hydrogen from the outlet, and a control device that controls the fourth opening/closing part and the fifth opening/closing part. The control device controls the fourth opening/closing part and the fifth opening/closing part based on at least the wet state of the proton exchange film.

17 Claims, 7 Drawing Sheets

(51) Int. Cl.
*C01B 3/38* (2006.01)
*C01B 3/56* (2006.01)

(56) References Cited

FOREIGN PATENT DOCUMENTS

| | | |
|---|---|---|
| JP | 2010165463 | 7/2010 |
| JP | 2011028937 | 2/2011 |
| JP | 2012043677 | 3/2012 |
| JP | 2014062311 | 4/2014 |
| JP | 2019031700 | 2/2019 |
| JP | 2019099915 | 6/2019 |
| JP | 2019210205 | 12/2019 |
| JP | 6765060 | 10/2020 |

* cited by examiner

ELECTROCHEMICAL HYDROGEN COMPRESSION SYSTEM

CROSS-REFERENCE TO RELATED APPLICATION

This application claims the priority benefits of Japanese application no. 2020207572 filed on Dec. 15, 2020 and Japanese application no. 2021-078698 filed on May 6, 2021. The entirety of the above-mentioned patent applications is hereby incorporated by reference herein and made a part of this specification.

BACKGROUND

Technical Field

The disclosure relates to an electrochemical hydrogen compression system.

Description of Related Art

Generally, hydrogen gas is used as the fuel gas in the power generation reaction of a fuel cell mounted on a fuel cell vehicle or the like. Hydrogen gas can be produced by a hydrogen production system equipped with a water electrolyzer. The hydrogen production system electrolyzes water with the water electrolyzer to generate hydrogen gas at the cathode of the water electrolyzer.

It is desirable to store the generated hydrogen gas at a high density from the aspects of reduction of transportation costs and ease of supply to the fuel cell. An electrochemical hydrogen compression device (see, for example, Patent Document 1) is known as a device for compressing hydrogen gas. The electrochemical hydrogen compression device includes an electrolyte film, an anode electrode and a cathode electrode provided on two surfaces of the electrolyte film, and a current regulator adjusting the amount of a current flowing between the anode electrode and the cathode electrode, and applies the current between the anode electrode and the cathode electrode through the current regulator to compress the hydrogen supplied to the anode electrode side, supply it to the cathode electrode side, and discharge the compressed hydrogen.

In the electrochemical hydrogen compression device, the electrolyte film is required to be in a wet state in order to secure good proton conductivity of the electrolyte film and improve energy efficiency. In the hydrogen supply system described in Patent Document 1, a dew point regulator is provided to adjust the dew point of a mixed gas in which the hydrogen-containing gas discharged from the anode electrode side and the hydrogen-containing gas supplied from the outside are mixed. It can reduce the possibility that the proton conductivity of the electrolyte film is lowered and the possibility that the gas flow path is blocked by condensed water due to the condensation of water vapor in the mixed gas.

RELATED ART

Patent Document

[Patent Document 1] Japanese Laid-Open No. 2019-099915

Problems to be Solved

However, in the above-described conventional technology, it is not possible to control the distribution of the wet state in the electrolyte film, which may be caused by the distribution of the flow of hydrogen gas in the electrochemical hydrogen compression device. Therefore, there is room for improvement in the conventional technology in terms of suppressing the distribution in the wet state of the electrolyte film and operating the electrochemical hydrogen compression device with high efficiency.

SUMMARY

An electrochemical hydrogen compression system (for example, the electrochemical hydrogen compression system 1 of the embodiment) according to the disclosure includes: a hydrogen supply source (for example, the hydrogen supply source 5 of the embodiment); an electrochemical hydrogen compression device (for example, the hydrogen gas compression part 7 of the embodiment) having a unit cell (for example, the unit cell 81 of the embodiment) formed by an electrolyte film (for example, the proton exchange film 82 of the embodiment) and an anode (for example, the anode 83 of the embodiment) and a cathode (for example, the cathode 84 of the embodiment) provided on two surfaces of the electrolyte film, and compressing hydrogen by applying a current between the anode and the cathode; and a supply pipeline (for example, the supply pipelines 10 and 10A of the embodiment) guiding the hydrogen discharged from the hydrogen supply source to the electrochemical hydrogen compression device. The electrochemical hydrogen compression device has: an inlet (for example, the inlet 94 of the embodiment) into which the hydrogen supplied from the hydrogen supply source flows; and an outlet (for example, the low-pressure side outlet 95 of the embodiment) from which unreacted hydrogen of the hydrogen flowing into the inlet is discharged. The electrochemical hydrogen compression system further includes: a power supply (for example, the power supply 80 of the embodiment) supplying the current applied between the anode and the cathode; an acquisition part (for example, the film resistance meter 101 and the voltmeter 103 of the embodiment) acquiring information related to a wet state of the electrolyte film; a regulation part (for example, the fourth opening/closing part 42, the third decompression part 44, and the fifth opening/closing part 47 of the embodiment) regulating discharge of the hydrogen from the outlet; and a control device (for example, the control device 9 of the embodiment) controlling the regulation part. The control device controls the regulation part based on at least the wet state.

DESCRIPTION OF THE EMBODIMENTS

Figure 1:
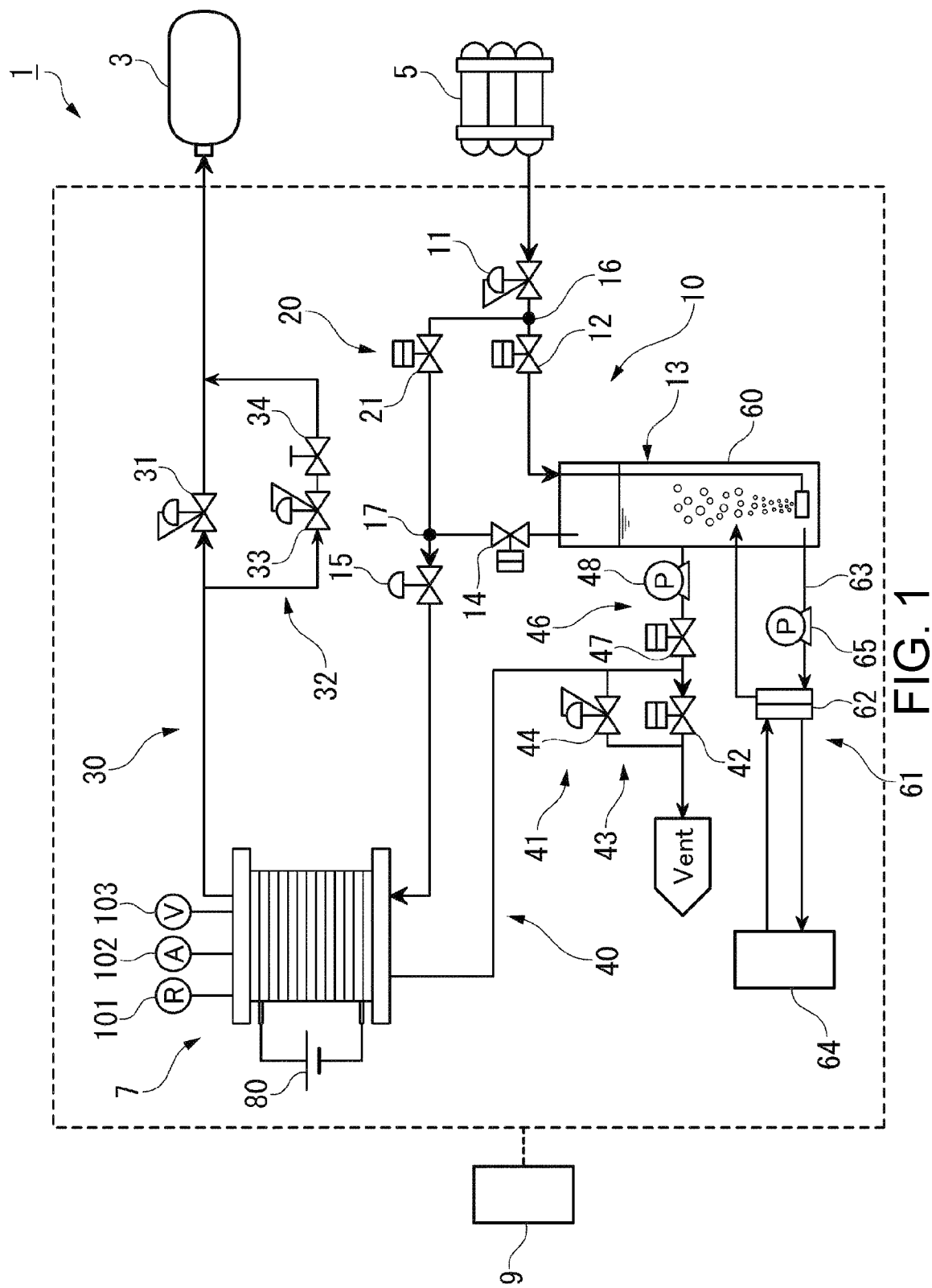
FIG. 1 is a diagram showing a configuration of an electrochemical hydrogen compression system according to the first embodiment.

The disclosure provides an electrochemical hydrogen compression system that can operate an electrochemical hydrogen compression device with high efficiency.

Means for Solving the Problems

An electrochemical hydrogen compression system (for example, the electrochemical hydrogen compression system 1 of the embodiment) according to the disclosure includes: a hydrogen supply source (for example, the hydrogen supply source 5 of the embodiment); an electrochemical hydrogen compression device (for example, the hydrogen gas compression part 7 of the embodiment) having a unit cell (for example, the unit cell 81 of the embodiment) formed by an electrolyte film (for example, the proton exchange film 82 of the embodiment) and an anode (for example, the anode 83 of the embodiment) and a cathode (for example, the cathode 84 of the embodiment) provided on two surfaces of the electrolyte film, and compressing hydrogen by applying a current between the anode and the cathode; and a supply pipeline (for example, the supply pipelines 10 and 10A of the embodiment) guiding the hydrogen discharged from the hydrogen supply source to the electrochemical hydrogen compression device. The electrochemical hydrogen compression device has: an inlet (for example, the inlet 94 of the embodiment) into which the hydrogen supplied from the hydrogen supply source flows; and an outlet (for example, the low-pressure side outlet 95 of the embodiment) from which unreacted hydrogen of the hydrogen flowing into the inlet is discharged. The electrochemical hydrogen compression system further includes: a power supply (for example, the power supply 80 of the embodiment) supplying the current applied between the anode and the cathode; an acquisition part (for example, the film resistance meter 101 and the voltmeter 103 of the embodiment) acquiring information related to a wet state of the electrolyte film; a regulation part (for example, the fourth opening/closing part 42, the third decompression part 44, and the fifth opening/closing part 47 of the embodiment) regulating discharge of the hydrogen from the outlet; and a control device (for example, the control device 9 of the embodiment) controlling the regulation part. The control device controls the regulation part based on at least the wet state.

According to the disclosure, since the discharge of hydrogen from the outlet can be regulated by the regulation part, the flow of hydrogen gas in the unit cells can be uniformized between the unit cells, and the hydrogen gas and water vapor flowing into all the unit cells can be retained in each unit cell. Thus, it is possible to suppress the occurrence of distribution in the wet state of the electrolyte film and to bring the electrolyte film into a good wet state. Accordingly, the increase in power consumption due to the voltage rise between the anode and the cathode can be suppressed to operate the electrochemical hydrogen compression device with high efficiency.

In the above electrochemical hydrogen compression system, the control device may change a regulation state of the regulation part based on the wet state, and change a pressure of the hydrogen flowing to an outlet side.

According to the disclosure, the relationship between the pressure of hydrogen gas at the anode and the water content of the electrolyte film can be made appropriate. Accordingly, the electrolyte film can be in a good wet state.

The above electrochemical hydrogen compression system may further include: a humidifier (for example, the humidifier 13 of the embodiment) provided in the supply pipeline and humidifying the hydrogen flowing through the supply pipeline; a branch pipeline (for example, the branch pipeline 20 of the embodiment) branching from the supply pipeline on an upstream side of the humidifier and joining the supply pipeline on a downstream side of the humidifier; and a switching part (for example, the first opening/closing part 12 and the third opening/closing part 21 of the embodiment) switching flow of the hydrogen to the branch pipeline, and the control device may control the switching part based on the wet state.

According to the disclosure, when the water content of the electrolyte film is excessive, dry hydrogen gas can be supplied from the hydrogen supply source to the unit cell to eliminate the state where the water content of the electrolyte film is excessive. Thus, the electrolyte film can be in a good wet state. Accordingly, the increase in power consumption due to the voltage rise between the anode and the cathode can be suppressed to operate the electrochemical hydrogen compression device with high efficiency.

The above electrochemical hydrogen compression system may further include: a humidifier (for example, the humidifier 13 of the embodiment) provided in the supply pipeline and humidifying the hydrogen flowing through the supply pipeline; a distribution pipeline (for example, the distribution pipeline 18 of the embodiment) being a part of the supply pipeline and branching on a downstream side of the humidifier and connected to the electrochemical hydrogen compression device; and a distribution control valve (for example, the second flow rate adjusting part 19) controlling a flow rate of the hydrogen in each distribution pipeline. The electrochemical hydrogen compression device may include a cell unit (for example, the cell unit 71 of the embodiment) in which the unit cell is laminated. The cell unit may include a plurality of regions (for example, the regions A and B of the embodiment) divided based on a temperature distribution during an operation of the electrochemical hydrogen compression device, and at least one distribution pipeline may be connected to each of the plurality of regions of the cell unit.

According to the disclosure, where a distribution can be generated in the wet state of the electrolyte film corresponding to the temperature distribution of the cell unit, the hydrogen gas supplied to the plurality of regions divided based on the temperature distribution in the cell unit can be separately controlled by the distribution control valve, and therefore it is possible to suppress variations in the wet state in the cell unit. Accordingly, the electrochemical hydrogen compression device can be operated with high efficiency.

In the above electrochemical hydrogen compression system, the distribution pipeline may be connected to each unit cell.

According to the disclosure, since the hydrogen gas supplied to each unit cell can be controlled separately, variations in the wet state in the cell unit can be further suppressed. Accordingly, the electrochemical hydrogen compression device can be operated with high efficiency.

The above electrochemical hydrogen compression system may further include: a branch pipeline (for example, the branch pipeline 20A of the embodiment) branching from the supply pipeline on an upstream side of the humidifier; and a switching part (for example, the first opening/closing part 12 and the third opening/closing part 21 of the embodiment) switching flow of the hydrogen to the branch pipeline. The branch pipeline may join each distribution pipeline, and the control device may control the switching part based on the wet state.

According to the disclosure, when the water content of the electrolyte film is excessive, dry hydrogen gas can be supplied from the hydrogen supply source to the unit cell to eliminate the state where the water content of the electrolyte film is excessive. In particular, since the branch pipeline joins each of the distribution pipelines, dry hydrogen gas can be selectively supplied to the region, which includes the unit cells that have an excessive water content. Thereby, it is possible to suppress an excessive supply of dry hydrogen gas to the unit cell in which the water content in the electrolyte film is not excessive. Thus, the electrolyte film can be kept in a good wet state while variations in the wet state of the electrolyte film are suppressed. Accordingly, the electrochemical hydrogen compression device can be operated with high efficiency.

The above electrochemical hydrogen compression system may further include: a control valve (for example, the first flow rate adjusting part 15 of the embodiment) provided in the supply pipeline and controlling a flow rate of the hydrogen discharged from the hydrogen supply source, and the control device may control the control valve so that the pressure of the hydrogen flowing to the outlet side is less than a predetermined value.

According to the disclosure, it is possible to suppress an excessive supply of hydrogen gas to the anode, and to make the relationship between the pressure of the hydrogen gas at the anode and the water content of the electrolyte film appropriate. Accordingly, the electrolyte film can be in a good wet state.

The above electrochemical hydrogen compression system may further include: a control valve (for example, the first flow rate adjusting part 15 of the embodiment) provided in the supply pipeline and controlling a flow rate of the hydrogen discharged from the hydrogen supply source, and the control device may control the control valve according to a state of applying the current between the anode and the cathode.

According to the disclosure, when the consumption of hydrogen gas at the anode increases or decreases according to the increase or decrease in the applied current, hydrogen gas can be appropriately supplied to the anode to prevent excess or deficiency of hydrogen gas from occurring at the anode.

Effects

According to the disclosure, an electrochemical hydrogen compression system that can operate an electrochemical hydrogen compression device with high efficiency can be provided.

Hereinafter, embodiments of the disclosure will be described with reference to the drawings. An electrochemical hydrogen compression system according to an embodiment compresses hydrogen gas to, for example, 1 to 100 MPa, and is capable of accommodating the compressed high-pressure hydrogen gas in a hydrogen gas tank that is detachably attached to the electrochemical hydrogen compression system, for example. In the following description, the electrochemical hydrogen compression system may be simply referred to as a hydrogen compression system.

First Embodiment

Configuration of Electrochemical Hydrogen Compression System 1

FIG. 1 is a diagram showing a configuration of a hydrogen compression system according to the first embodiment. As shown in FIG. 1, the hydrogen compression system 1 includes a hydrogen supply source 5, a hydrogen gas compression part 7 that compresses hydrogen gas, and a control device 9 that controls each part of the hydrogen compression system 1. Further, the hydrogen compression system 1 includes a supply pipeline 10 that guides the hydrogen gas discharged from the hydrogen supply source 5 to the hydrogen gas compression part 7, a branch pipeline 20 that bypasses a part of the supply pipeline 10, a high-pressure discharge pipeline 30 through which the high-pressure hydrogen gas compressed by the hydrogen gas compression part 7 flows, and a low-pressure discharge pipeline 40 through which unreacted hydrogen gas that is surplus in the hydrogen gas compression part 7 flows.

The hydrogen supply source 5 is formed so that the stored dry hydrogen gas can be discharged. For example, the hydrogen supply source 5 is a curdle in which gas cylinders storing hydrogen gas are collected.

The supply pipeline 10 is connected to the hydrogen supply source 5. Thereby, the hydrogen gas discharged from the hydrogen supply source 5 is circulated in the supply pipeline 10. In the supply pipeline 10, a decompression part 11, a first opening/closing part 12, a humidifier 13, a second opening/closing part 14, and a first flow rate adjusting part 15 are provided in this order from the side of the hydrogen supply source 5 to the side of the hydrogen gas compression part 7.

The decompression part 11 adjusts the pressure of the hydrogen gas in the supply pipeline 10. The decompression part 11 regulates the hydrogen gas passing through the decompression part 11. For example, the decompression part 11 is a decompression valve that opens while maintaining the pressure on the secondary side (downstream side) at a set pressure. However, the decompression part 11 is not limited to the decompression valve, and may be, for example, an opening/closing valve that is controlled to open/close by the control device 9 to maintain the pressure of the supply pipeline 10 at the set pressure. Further, the decompression part 11 may include a plurality of decompression valves.

The first opening/closing part 12 opens/closes the supply pipeline 10 on the upstream side of the humidifier 13. The first opening/closing part 12 is, for example, a solenoid valve or an electric valve, and opens/closes the supply pipeline 10 based on control of the control device 9. By setting the first opening/closing part 12 to the open state, it is possible to supply hydrogen gas from the supply pipeline 10 to the humidifier 13.

The humidifier 13 humidifies the hydrogen gas flowing through the supply pipeline 10. For example, the humidifier 13 humidifies hydrogen gas by a bubbler humidification method. In this case, the humidifier 13 has a closed container 60 storing liquid water, and humidifies by bubbling the hydrogen gas introduced from the side of the hydrogen supply source 5 into the liquid water in the closed container 60. A hydrogen gas storage space is formed in the closed container 60 above the liquid surface to collect the hydrogen gas passing through the liquid water. The closed container 60 is provided with a takeout port that opens to the hydrogen gas storage space. The humidified hydrogen gas is discharged from the takeout port.

A temperature adjusting device 61 that adjusts the temperature of the stored liquid water is connected to the humidifier 13. The temperature adjusting device 61 includes a heat exchanger 62, a circulation flow path 63 forming a circulation path of the heat exchanger 62 and the inside of the closed container 60, and a chiller 64 connected to the heat exchanger 62. A pump 65 is provided in the circulation flow path 63. Thereby, the liquid water stored in the closed container 60 can be constantly circulated between the humidifier 13 and the heat exchanger 62, and can be maintained at an appropriately set temperature.

The second opening/closing part 14 opens/closes the supply pipeline 10 on the downstream side of the humidifier 13. The second opening/closing part 14 is, for example, a solenoid valve or an electric valve, and opens/closes the supply pipeline 10 based on control of the control device 9. When the second opening/closing part 14 is in the closed state, discharge of the hydrogen gas from the humidifier 13 toward the hydrogen gas compression part 7 is regulated.

The first flow rate adjusting part 15 adjusts the flow rate and pressure of the hydrogen gas introduced from the supply pipeline 10 to the hydrogen gas compression part 7. The first flow rate adjusting part 15 is a control valve, and adjusts the flow rate of the hydrogen gas passing through the first flow rate adjusting part 15 based on control of the control device 9.

The branch pipeline 20 bypasses the humidifier 13. The branch pipeline 20 branches from the supply pipeline 10 at a branch portion 16 on the upstream side of the humidifier 13, and joins the supply pipeline 10 at a confluence portion 17 on the downstream side of the humidifier 13. The branch portion 16 is provided on the downstream side of the decompression part 11 and on the upstream side of the first opening/closing part 12. The confluence portion 17 is provided on the downstream side of the second opening/closing part 14 and on the upstream side of the first flow rate adjusting part 15. The branch pipeline 20 has a third opening/closing part 21. The third opening/closing part 21 opens/closes the branch pipeline 20. The third opening/closing part 21 is, for example, a solenoid valve or an electric valve, and opens/closes the branch pipeline 20 based on control of the control device 9. When the third opening/closing part 21 is in the closed state, the flow of hydrogen gas in the branch pipeline 20 is regulated. When the third opening/closing part 21 is in the open state, the flow of hydrogen gas in the branch pipeline 20 is permitted. The third opening/closing part 21, together with the first opening/closing part 12, functions as a switching part that switches the flow of hydrogen to the branch pipeline 20.

The hydrogen gas compression part 7 compresses the hydrogen gas flowing through the supply pipeline 10. The hydrogen gas compression part 7 is an electrochemical hydrogen compression device (EHC: Electrochemical Hydrogen Compressor) that can electrochemically compress hydrogen gas. The hydrogen gas compression part 7 includes a proton exchange film (electrolyte film) 82, an anode 83 and a cathode 84 isolated by interposing the proton exchange film 82, and a power supply 80 applying a current to the anode 83 and the cathode 84, and compresses the hydrogen gas supplied to the anode 83 to generate high-pressure hydrogen gas at the cathode 84.

Figure 2:
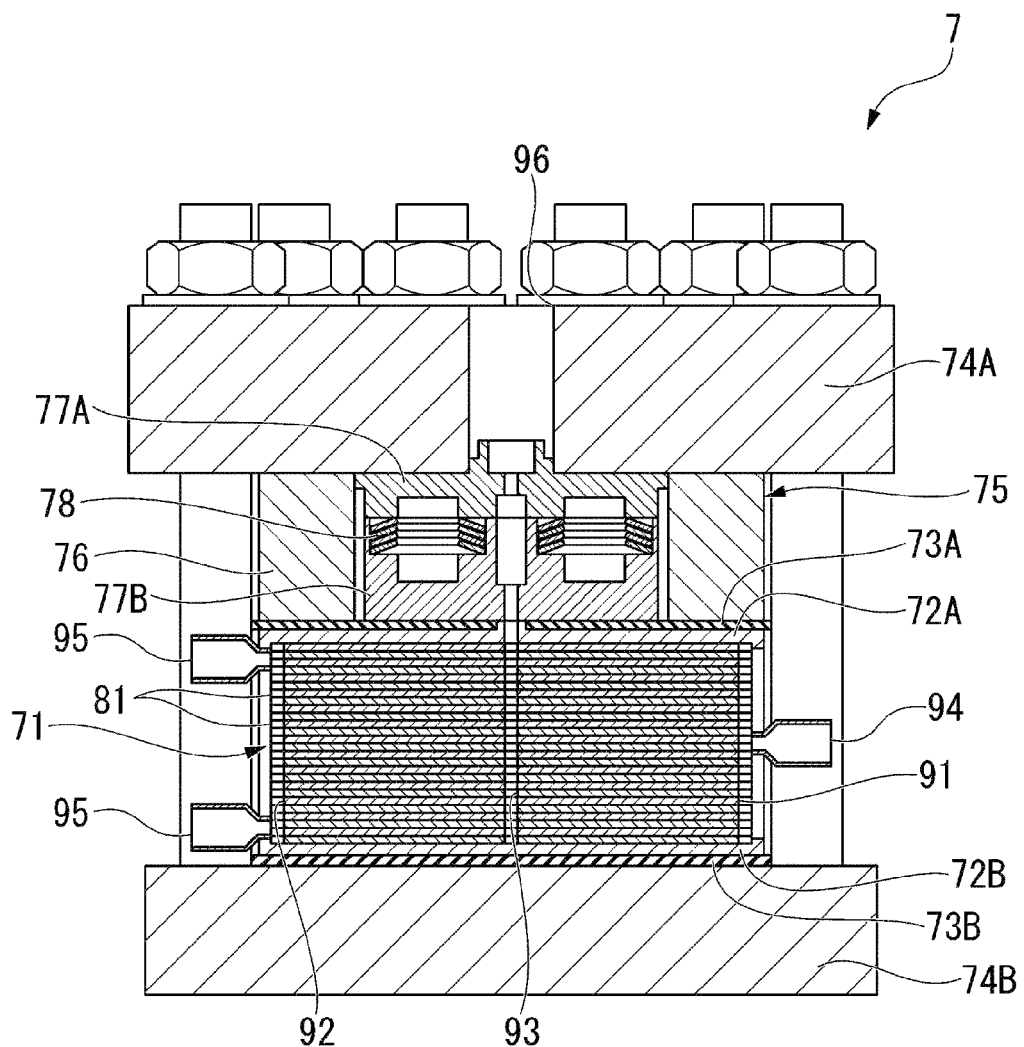
FIG. 2 is a diagram showing a cross-sectional structure of a hydrogen gas compression part.

FIG. 2 is a diagram showing a cross-sectional structure of the hydrogen gas compression part. As shown in FIG. 2, the hydrogen gas compression part 7 includes a cell unit 71 in which a plurality of unit cells 81 each including one group of the proton exchange film 82, the anode 83, and the cathode 84 are laminated. At one end of the cell unit 71 in the lamination direction of the unit cells 81, a terminal plate 72A, an insulating plate 73A, a pressing unit 75, and an end plate 74A are sequentially arranged outward. Further, at the other end of the cell unit 71 in the lamination direction of the unit cells 81, a terminal plate 72B, an insulating plate 73B, and an end plate 74B are sequentially arranged outward.

The plurality of unit cells 81 are integrally fastened and held between the end plates 74A and 74B. The pressing unit 75 includes a cylindrical cylinder 76, a pair of pistons 77A and 77B arranged on the inner side of the cylinder 76, and an urging member 78 arranged between the pair of pistons 77A and 77B. The cylinder 76 extends between the insulating plate 73A and the end plate 74A in the lamination direction of the unit cells 81. The pair of pistons 77A and 77B are arranged in the lamination direction with the urging member 78 interposed therebetween. The urging member 78 urges the piston 77A on the side of the end plate 74A toward the side of the end plate 74A, and urges the piston 77B on the side of the cell unit 71 toward the side of the cell unit 71. Thereby, the pressing unit 75 presses the cell unit 71 toward the side of the end plate 74B via the insulating plate 73A and the terminal plate 72A, and constantly integrates the plurality of unit cells 81. Terminal portions (not shown) are provided on the side portions of the terminal plates 72A and 72B to respectively project outward. The power supply 80 is electrically connected to the terminal portions. The power supply 80 can apply a current to the anode 83 and the cathode 84 of each unit cell 81 via the terminal portions.

Figure 3:
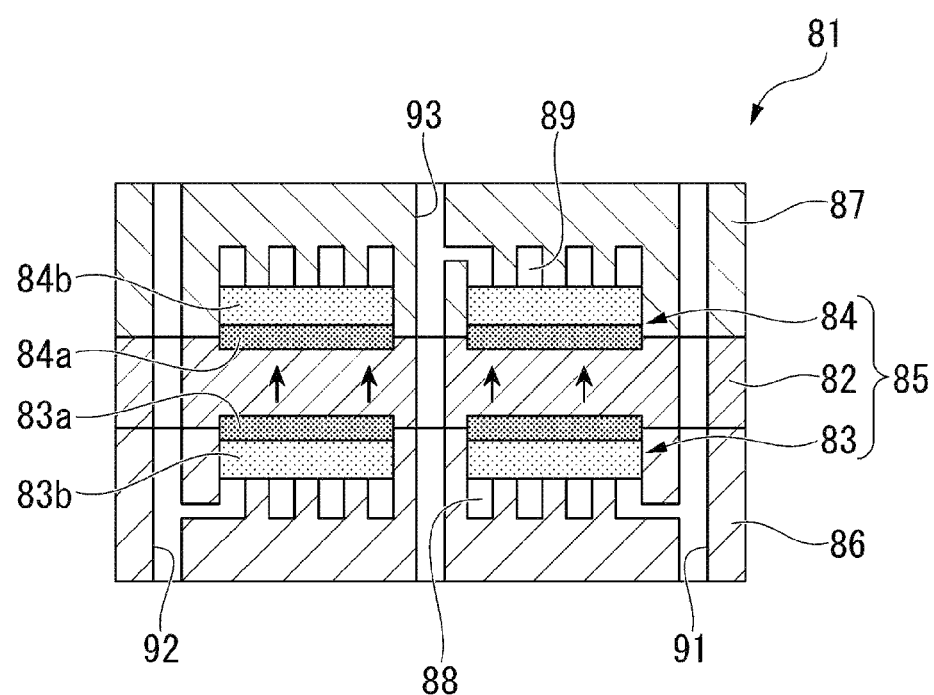
FIG. 3 is a diagram showing a cross-sectional structure of a unit cell of the hydrogen gas compression part.

FIG. 3 is a diagram schematically showing a cross-sectional structure of the unit cell of the hydrogen gas compression part. As shown in FIG. 3, each unit cell 81 includes, for example, a disk-shaped electrolyte film/electrode structure 85, a disk-shaped anode-side separator 86 and a disk-shaped cathode-side separator 87 that sandwich the electrolyte film/electrode structure 85. The electrolyte film/electrode structure 85 has the proton exchange film 82, and the anode 83 and the cathode 84 provided on two surfaces of the proton exchange film 82. In each unit cell 81, the anode 83 and the cathode 84 sandwiching the proton exchange film 82 are sealed (isolated) by the proton exchange film 82 or a sealing member (not shown) so as not to communicate with each other.

The proton exchange film 82 has proton conductivity for selectively moving protons. The material of the proton exchange film 82 is not particularly limited, and as an example, may be a fluorine-based polymer film having a sulfonic acid group such as a perfluorosulfonic acid-based polymer. The proton exchange film 82 of this type is maintained in a wet state, so that the proton conductivity is satisfactorily exhibited.

The anode 83 has an anode electrode catalyst layer 83a and an anode-side power feeder 83b formed on one surface of the proton exchange film 82. The cathode 84 has a cathode electrode catalyst layer 84a and a cathode-side power feeder 84b formed on the other surface of the proton exchange film 82.

The anode-side separator 86 faces the anode 83. The anode-side separator 86 forms a low-pressure hydrogen gas flow path 88 with the anode 83. The low-pressure hydrogen gas flow path 88 is formed by a recess such as a groove provided on the surface of the anode-side separator 86 facing the anode 83. The cathode-side separator 87 faces the cathode 84. The cathode-side separator 87 forms a high-pressure hydrogen gas flow path 89 with the cathode 84. The high-pressure hydrogen gas flow path 89 is formed by a recess such as a groove provided on the surface of the cathode-side separator 87 facing the cathode 84.

As shown in FIG. 2, the hydrogen gas compression part 7 is provided with a supply communication hole 91, a first discharge communication hole 92, and a second discharge communication hole 93. Each of the supply communication hole 91, the first discharge communication hole 92, and the second discharge communication hole 93 is formed so as to penetrate the unit cells 81 in the lamination direction. The supply communication hole 91 communicates with the low-pressure hydrogen gas flow path 88 of each unit cell 81. The first discharge communication hole 92 communicates with the low-pressure hydrogen gas flow path 88 of each unit cell 81, and also communicates with the supply communication hole 91 via the low-pressure hydrogen gas flow path 88. The supply communication hole 91 and the first discharge communication hole 92 penetrate the outer peripheral portion of each unit cell 81. The second discharge communication hole 93 communicates with the high-pressure hydrogen gas flow path 89 of each unit cell 81. The second discharge communication hole 93 penetrates the central portion of each unit cell 81. Further, the second discharge communication hole 93 penetrates the terminal plate 72A, the insulating plate 73A, the pressing unit 75, and the end plate 74A in the lamination direction.

The hydrogen gas compression part 7 includes an inlet 94 connected to the downstream end of the supply pipeline 10, a low-pressure side outlet 95 connected to the upstream end of the low-pressure discharge pipeline 40, and a high-pressure side outlet 96 connected to the upstream end of the high-pressure discharge pipeline 30. The inlet 94 communicates the supply communication hole 91 and the downstream end of the supply pipeline 10. The hydrogen supplied from the hydrogen supply source 5 flows into the inlet 94. The low-pressure side outlet 95 communicates the first discharge communication hole 92 and the upstream end of the low-pressure discharge pipeline 40. The low-pressure side outlet 95 discharges the unreacted hydrogen gas (described later) of the hydrogen gas flowing into the inlet 94. The connection portion between the inlet 94 and the supply communication hole 91 is formed at a different position in the lamination direction of the unit cells 81 from the connection portion between the low-pressure side outlet 95 and the first discharge communication hole 92. The inlet 94 is connected to the supply communication hole 91 at a position corresponding to the intermediate portion of the cell unit 71 in the lamination direction. The low-pressure side outlet 95 is connected to the first discharge communication hole 92 at positions corresponding to two end portions of the cell unit 71 in the lamination direction. The high-pressure side outlet 96 communicates the second discharge communication hole 93 and the upstream end of the high-pressure discharge pipeline 30. The high-pressure side outlet 96 discharges the compressed high-pressure hydrogen gas. The high-pressure side outlet 96 opens the second discharge communication hole 93 toward the outside of the hydrogen gas compression part 7 at the end plate 74A.

Hydrogen gas flows into the low-pressure hydrogen gas flow path 88 from the supply pipeline 10 via the inlet 94 and the supply communication hole 91. Thereby, the hydrogen gas is supplied to the anode 83. When a current is applied to the anode 83 and the cathode 84 by the power supply 80, the hydrogen gas compression part 7 generates hydrogen gas having a higher pressure than the hydrogen gas supplied to the anode 83 at the cathode 84. The high-pressure hydrogen gas generated at the cathode 84 flows through the high-pressure hydrogen gas flow path 89, and is discharged from the hydrogen gas compression part 7 via the second discharge communication hole 93 and the high-pressure side outlet 96. Further, the hydrogen gas compression part 7 is capable of discharging the unreacted low-pressure hydrogen gas of the hydrogen gas supplied to the anode 83 from the hydrogen gas compression part 7 via the first discharge communication hole 92 and the low-pressure side outlet 95.

As shown in FIG. 1, the hydrogen gas compression part 7 includes a film resistance meter 101, an ammeter 102, and a voltmeter 103. The film resistance meter 101 measures the film resistance value of the proton exchange film 82 of each unit cell 81. The ammeter 102 measures the current value applied to the entire cell unit 71. The voltmeter 103 measures the voltage value between the anode 83 and the cathode 84 of each unit cell 81. The film resistance meter 101 and the voltmeter 103 function as an acquisition part that acquires information related to the wet state of the proton exchange film 82, which will be described later.

The high-pressure discharge pipeline 30 guides the high-pressure hydrogen gas discharged from the hydrogen gas compression part 7 to a hydrogen gas tank 3. The high-pressure discharge pipeline 30 includes a hydrogen gas discharge regulation part 31. The hydrogen gas discharge regulation part 31 adjusts the pressure of the hydrogen gas in the high-pressure discharge pipeline 30. The hydrogen gas discharge regulation part 31 regulates the hydrogen gas passing through the hydrogen gas discharge regulation part 31. For example, the high-pressure discharge pipeline 30 makes the amount of hydrogen gas passing through the hydrogen gas discharge regulation part 31 smaller than the amount of high-pressure hydrogen gas generated at the cathode 84 of the hydrogen gas compression part 7. Thereby, the hydrogen gas discharge regulation part 31 can increase the pressure of the hydrogen gas in the high-pressure discharge pipeline 30 to obtain high-pressure hydrogen gas.

For example, the hydrogen gas discharge regulation part 31 is a back pressure valve that opens while maintaining the pressure on the primary side (upstream side) at a set pressure. However, the hydrogen gas discharge regulation part 31 is not limited to the back pressure valve, and may be, for example, an opening/closing valve that is controlled to open/close by the control device 9 to maintain the pressure of the high-pressure discharge pipeline 30 at the set pressure.

The hydrogen gas discharge regulation part 31 adjusts the pressure of the hydrogen gas in the high-pressure discharge pipeline 30 to 1 to 100 MPa to obtain high-pressure hydrogen gas. The hydrogen gas discharge regulation part 31 preferably sets the pressure of the high-pressure hydrogen gas to at least 8 MPa or more from the aspect of facilitating the supply of hydrogen gas to the hydrogen gas tank 3, for example. Further, for example, when hydrogen gas is supplied to a hydrogen gas tank for a fuel cell vehicle or the like, the hydrogen gas discharge regulation part 31 preferably sets the pressure of the high-pressure hydrogen gas to 70 MPa or more.

The high-pressure discharge pipeline 30 is provided with a bypass part 32 that bypasses the hydrogen gas discharge regulation part 31. The bypass part 32 is provided with a second decompression part 33 and a bypass opening/closing part 34 in this order from the upstream side toward the downstream side. The second decompression part 33 adjusts the pressure of the hydrogen gas in the bypass part 32. The second decompression part 33 regulates the hydrogen gas passing through the second decompression part 33. The second decompression part 33 is a decompression valve that opens while maintaining the pressure on the secondary side (downstream side) at a set pressure. The bypass opening/closing part 34 is a gate valve that opens/closes the bypass part 32. For example, the bypass opening/closing part 34 is a manual gate valve. When the bypass opening/closing part 34 is in the closed state, the flow of hydrogen gas in the bypass part 32 is regulated. When the bypass opening/closing part 34 is in the open state, the flow of hydrogen gas in the bypass part 32 is permitted.

The low-pressure discharge pipeline 40 circulates the low-pressure hydrogen gas discharged from the hydrogen gas compression part 7. The low-pressure discharge pipeline 40 includes a vent line 41 and a reflux line 46. The upstream end of the vent line 41 is connected to the low-pressure side outlet 95 of the hydrogen gas compression part 7. The vent line 41 includes a fourth opening/closing part 42. The fourth opening/closing part 42 opens/closes the vent line 41. The fourth opening/closing part 42 is, for example, a solenoid valve or an electric valve, and opens/closes the vent line 41 based on control of the control device 9. When the fourth opening/closing part 42 is in the open state, the hydrogen gas in the vent line 41 is discharged to the outside. A pressure adjusting line 43 that bypasses the fourth opening/closing part 42 is connected to the vent line 41. The pressure adjusting line 43 is provided with a third decompression part 44. The third decompression part 44 regulates the hydrogen gas passing through the third decompression part 44. The third decompression part 44 is a back pressure valve that opens while maintaining the pressure on the primary side (upstream side) at a set pressure.

The reflux line 46 branches from the vent line 41 on the upstream side of the fourth opening/closing part 42. The downstream end of the reflux line 46 communicates with the inside of the closed container 60 of the humidifier 13. The reflux line 46 is provided with a fifth opening/closing part 47 and a pump 48 in this order from the upstream side toward the downstream side. The fifth opening/closing part 47 opens/closes the reflux line 46. The fifth opening/closing part 47 is, for example, a solenoid valve or an electric valve, and opens/closes the reflux line 46 based on control of the control device 9. When the fifth opening/closing part 47 is in the open state, the pump 48 pumps the hydrogen gas in the reflux line 46 into the closed container 60 of the humidifier 13. Thereby, the unreacted hydrogen gas in the hydrogen gas compression part 7 is refluxed. The fourth opening/closing part 42, the third decompression part 44, and the fifth opening/closing part 47 provided in the low-pressure discharge pipeline 40 function as a regulation part that regulates the discharge of hydrogen from the low-pressure side outlet 95.

The control device 9 integrally controls the operation of the hydrogen compression system 1. The control device 9 monitors the measured values of the film resistance meter 101, the ammeter 102, and the voltmeter 103 of the hydrogen gas compression part 7. The control device 9 monitors the measured values of a pressure sensor, a flow meter, a thermometer, etc. (not shown) provided in each pipeline of the hydrogen compression system 1. The control device 9 is, for example, a software function unit that functions by execution of a predetermined program performed by a processor such as a CPU (Central Processing Unit). The software function unit is an ECU (Electronic Control Unit) including a processor such as a CPU, a ROM (Read Only Memory) storing a program, a RAM (Random Access Memory) temporarily storing data, and an electronic circuit such as a timer. At least a part of the control device 9 may be an integrated circuit such as an LSI (Large Scale Integration).

Operation of Electrochemical Hydrogen Compression System 1

The operation of the hydrogen compression system 1 according to the first embodiment will be described. When the hydrogen compression system 1 operates, depending on the open/closed states of the first opening/closing part 12 and the third opening/closing part 21, the hydrogen gas discharged from the hydrogen supply source 5 passes through the humidifier 13 or bypasses the humidifier 13 and is introduced into the hydrogen gas compression part 7. When the hydrogen gas passes through the humidifier 13, water vapor is introduced into the hydrogen gas compression part 7 together with the hydrogen gas. On the other hand, when the hydrogen gas bypasses the humidifier 13, the dry hydrogen gas stored in the hydrogen supply source 5 is introduced into the hydrogen gas compression part 7.

The hydrogen gas introduced into the hydrogen gas compression part 7 flows through the low-pressure hydrogen gas flow path 88 through the supply communication hole 91. Thereby, the hydrogen gas is supplied to the anode 83. Specifically, the hydrogen gas in the low-pressure hydrogen gas flow path 88 passes through the porous anode-side power feeder 83b and is supplied to the anode electrode catalyst layer 83a. When the hydrogen gas passes through the humidifier 13, the proton exchange film 82 maintains the wet state by utilizing the water vapor supplied to the anode 83.

When a current is applied to the anode 83 and the cathode 84, the anode 83 ionizes the hydrogen gas to generate protons. The generated protons pass through the proton exchange film 82 and reach the cathode 84 with water molecules, and then return to the hydrogen gas. In this way, the hydrogen gas compression part 7 moves the protons from the anode 83 toward the cathode 84 to generate high-pressure hydrogen gas at the cathode 84 and compress the hydrogen gas.

The high-pressure hydrogen gas generated at the cathode 84 flows through the high-pressure hydrogen gas flow path 89, and is discharged to the high-pressure discharge pipeline 30 through the second discharge communication hole 93. Therefore, the hydrogen gas compression part 7 can discharge the hydrogen gas having a higher pressure than the hydrogen gas supplied to the anode 83 from the cathode 84. The high-pressure hydrogen gas discharged to the high-pressure discharge pipeline 30 passes through the hydrogen gas discharge regulation part 31 or the bypass part 32 according to the open/closed state of the bypass opening/closing part 34, and is stored in the hydrogen gas tank 3.

The surplus unreacted hydrogen gas that is not ionized at the anode 83 flows through the low-pressure hydrogen gas flow path 88, and is discharged to the low-pressure discharge pipeline 40 through the first discharge communication hole 92. The unreacted hydrogen gas discharged to the low-pressure discharge pipeline 40 is discharged to the outside through the fourth opening/closing part 42 depending on the open/closed state of the fourth opening/closing part 42, or the flow of the low-pressure discharge pipeline 40 is regulated until the pressure of the low-pressure discharge pipeline 40 reaches the set pressure of the third decompression part 44. Further, by setting the fourth opening/closing part 42 to the closed state and the fifth opening/closing part 47 to the open state, the unreacted hydrogen gas is refluxed to the humidifier 13.

Control Method of Electrochemical Hydrogen Compression System 1

The control method of the hydrogen compression system 1 according to the first embodiment will be described. The control of each part of the hydrogen compression system 1 is performed by the control device 9. The control device 9 executes the processing flow described below until, for example, a system stop instruction is received.

Figure 4:
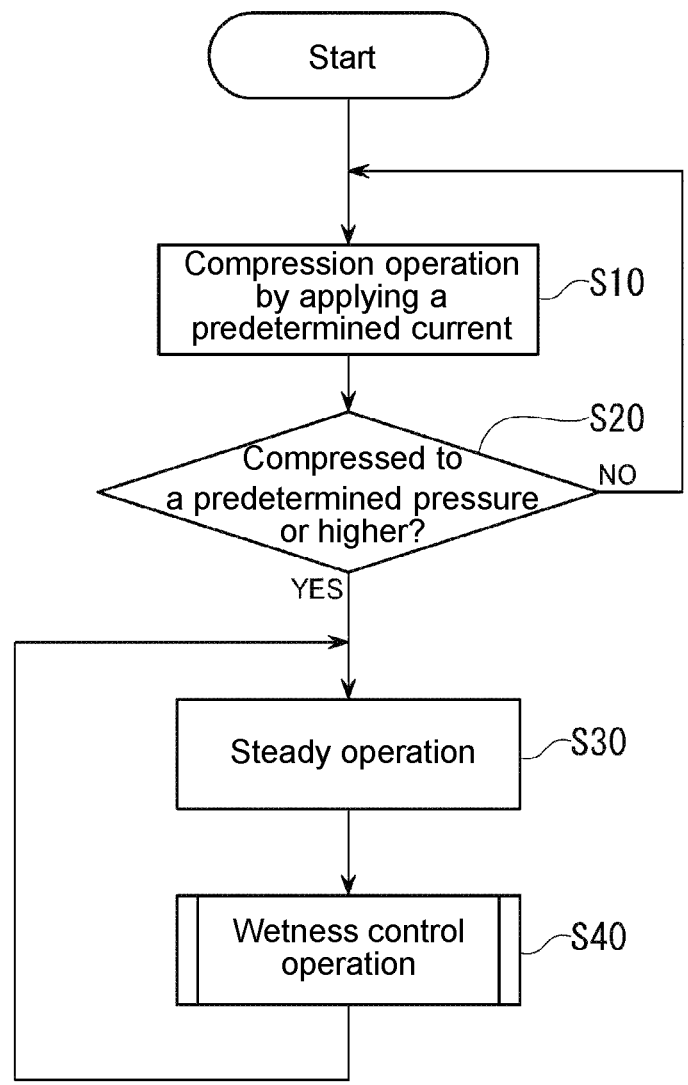
FIG. 4 is a flowchart showing an example of a flow of processing executed by the electrochemical hydrogen compression system according to the first embodiment.

FIG. 4 is a flowchart showing an example of the flow of processing executed by the hydrogen compression system according to the first embodiment. As shown in FIG. 4, the control device 9 first performs the process of step S10. In step S10, a compression operation is performed with the start of the hydrogen compression system 1. In the compression operation, the first opening/closing part 12 is set to the open state and the third opening/closing part 21 is set to the closed state to supply hydrogen gas to the hydrogen gas compression part 7. The amount of hydrogen gas supplied from the hydrogen supply source 5 to the hydrogen gas compression part 7 is appropriately controlled by the control device 9 (including zero supply amount). Then, the power supply 80 is controlled so as to apply a predetermined current between the anode 83 and the cathode 84 until the hydrogen gas compression part 7 is in a state where high-pressure hydrogen gas can be generated. When the hydrogen gas compression part 7 is in the state where high-pressure hydrogen gas can be generated, the power supply 80 increases the voltage applied between the anode 83 and the cathode 84 to apply a current to the anode 83 and the cathode 84 and start compressing the hydrogen gas. Thereby, the hydrogen gas compression part 7 generates high-pressure hydrogen gas at the cathode 84. Subsequently, the processing flow proceeds to the process of step S20.

In step S20, the control device 9 determines whether the pressure of the hydrogen gas at the cathode 84 reaches a predetermined pressure or higher. When the pressure at the cathode 84 is lower than the predetermined pressure (S20: NO), the process of step S10 is performed again. When the pressure at the cathode 84 reaches the predetermined pressure or higher (S20: YES), the processing flow proceeds to the process of step S30.

In step S30, the control device 9 performs a steady operation. In the steady operation, in order to store hydrogen gas in the hydrogen gas tank 3, the pressure and flow rate of the hydrogen gas in the high-pressure discharge pipeline 30, the flow rate of the hydrogen gas in the supply pipeline 10, etc. are monitored, and the opening degree of the first flow rate adjusting part 15 and the current applied between the anode 83 and the cathode 84 are controlled. Subsequently, the processing flow proceeds to the process of step S40. For example, when the process of step S30 is executed for a predetermined time, the control device 9 proceeds to the process of step S40.

In step S40, the control device 9 performs a wetness control operation. In the wetness control operation, the control device 9 controls each part of the hydrogen compression system 1 so as to maintain the proton exchange film 82 in a desired wet state. In the present embodiment, the control device 9 determines the wet state of the proton exchange film 82 based on the measured value of the voltmeter 103 of the hydrogen gas compression part 7. Thereafter, the control device 9 performs the process of step S30 again. The specific processing of the wetness control operation will be described later.

In the processes of step S30 and step S40, the control device 9 may control the first flow rate adjusting part 15 so that the pressure of the hydrogen gas flowing to the side of the low-pressure side outlet 95 is less than a predetermined value. Further, the control device 9 may control the first flow rate adjusting part 15 according to the state of the hydrogen gas compression part 7 applying the current between the anode 83 and the cathode 84.

Wetness Control Operation

Figure 5:
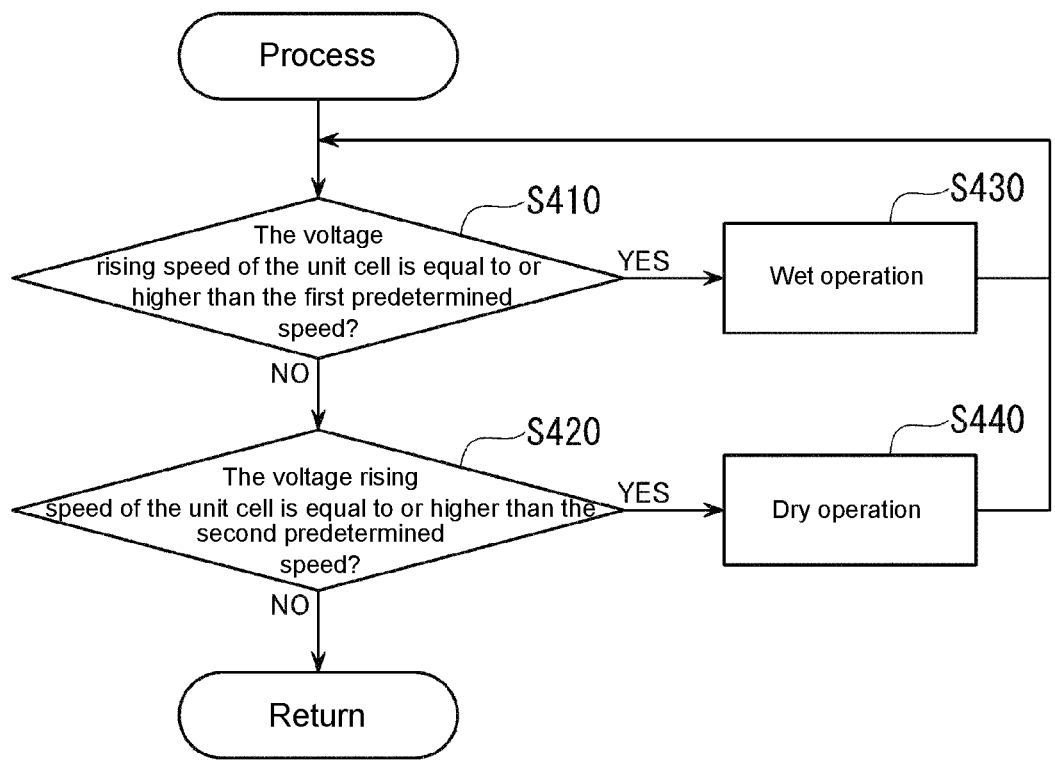
FIG. 5 is a flowchart showing an example of a flow of processing of a wetness control operation executed by the electrochemical hydrogen compression system according to the first embodiment.

FIG. 5 is a flowchart showing an example of the flow of processing of the wetness control operation executed by the hydrogen compression system according to the first embodiment. As shown in FIG. 5, the control device 9 first performs the process of step S410 when performing the wetness control operation. In step S410, the control device 9 acquires the voltage between the anode 83 and the cathode 84 in each unit cell 81, and determines whether the voltage rising speed per unit time in at least one unit cell 81 of the plurality of unit cells 81 is equal to or higher than a first predetermined speed. The first predetermined speed may be a predetermined speed, or may change depending on the temperature or the like of the unit cell 81. When the voltage rising speed is less than the first predetermined speed, the processing flow proceeds to the process of step S420. When the voltage rising speed is equal to or higher than the first predetermined speed, the processing flow proceeds to the process of step S430.

In step S420, the control device 9 determines whether the voltage rising speed per unit time in at least one unit cell 81 of the plurality of unit cells 81 is equal to or higher than a second predetermined speed. The second predetermined speed may be a predetermined speed, or may change depending on the temperature or the like of the unit cell 81. When the voltage rising speed is less than the second predetermined speed, the processing of the stack wetness control operation is terminated. When the voltage rising speed is equal to or higher than the second predetermined speed, the processing flow proceeds to the process of step S440.

In step S430, the control device 9 performs a wet operation. In the wet operation, the first opening/closing part 12 is set to the open state and the third opening/closing part 21 is set to the closed state, and then at least one of the fourth opening/closing part 42, the third decompression part 44, and the fifth opening/closing part 47 is controlled based on the wet state. Specifically, in the wet operation, the discharge of hydrogen from the low-pressure side outlet 95 is regulated by setting the fourth opening/closing part 42 and the fifth opening/closing part 47 to the closed state. Thereby, the hydrogen gas stays in the cell unit 71, so that the bias of the flow of hydrogen gas in the cell unit 71 is eliminated.

Further, in the wet operation, the regulation state of the third decompression part 44 is changed based on the wet state, and the pressure of the hydrogen flowing to the side of the low-pressure side outlet 95 is changed. The regulation state of the third decompression part 44 is the opening degree (set pressure) of the third decompression part 44. For example, the control device 9 controls the third decompression part 44 so that the pressure of the hydrogen gas flowing to the side of the low-pressure side outlet 95 is lower than that during the steady operation. When the control device 9 finishes the process of step S430, the control device 9 proceeds to the process of step S410 again. For example, when the process of step S430 is executed for a predetermined time, the control device 9 proceeds to the process of step S410.

In step S440, the control device 9 performs a dry operation. In the dry operation, the first opening/closing part 12 is set to the closed state and the third opening/closing part 21 is set to the open state. Thereby, the dry hydrogen gas discharged from the hydrogen supply source 5 is directly supplied to the cell unit 71. In the dry operation, at least one of the fourth opening/closing part 42, the third decompression part 44, and the fifth opening/closing part 47 may be controlled as in the wet operation.

Further, in the dry operation, the regulation state of the third decompression part 44 is changed based on the wet state, and the pressure of the hydrogen flowing to the side of the low-pressure side outlet 95 is changed. For example, the control device 9 controls the third decompression part 44 so that the pressure of the hydrogen gas flowing to the side of the low-pressure side outlet 95 is higher than that during the steady operation in the dry operation. When the control device 9 finishes the process of step S440, the control device 9 proceeds to the process of step S410 again. For example, when the process of step S440 is executed for a predetermined time, the control device 9 proceeds to the process of step S410.

Effect of Electrochemical Hydrogen Compression System 1

The effect of the hydrogen compression system 1 according to the first embodiment will be described. In the hydrogen gas compression part 7, hydrogen gas is introduced into the supply communication hole 91 from the inlet 94, and then distributed to the low-pressure hydrogen gas flow path 88 of each unit cell 81 to be supplied to the anode 83. The unreacted hydrogen gas at the anode 83 joins the first discharge communication hole 92 from the low-pressure hydrogen gas flow path 88 of each unit cell 81, and then is discharged from the low-pressure side outlet 95 to the low-pressure discharge pipeline 40. Therefore, the flow of hydrogen gas in the low-pressure hydrogen gas flow path 88 may differ between the unit cells 81 depending on the distances of the unit cells 81 to the inlet 94 and the low-pressure side outlet 95. For example, the low-pressure hydrogen gas flow path 88 of the unit cell 81 closer to the inlet 94 and the low-pressure side outlet 95 makes it easier for the hydrogen gas to flow. In the present embodiment, hydrogen gas easily flows through the low-pressure hydrogen gas flow paths 88 of the unit cells 81 located at two end portions and the intermediate portion of the cell unit 71 in the lamination direction of the unit cells 81.

In addition, the cell unit 71 is in contact with the terminal plates 72A and 72B at two ends of the unit cells 81 in the lamination direction. Therefore, among the plurality of unit cells 81, the unit cells 81 closer to two ends of the cell unit 71 in the lamination direction are more likely to dissipate heat via the terminal plates 72A and 72B. Thereby, the cell unit 71 can reach a high temperature in the intermediate portion in the lamination direction.

Here, in the unit cell 81, the supply amount of water vapor contained in the hydrogen gas decreases as the flow rate of hydrogen gas in the low-pressure hydrogen gas flow path 88 decreases. When the supply amount of water vapor decreases, the proton exchange film 82 may become dry and the wet state may deteriorate. When the proton exchange film 82 dries, the film resistance of the proton exchange film 82 increases. In addition, as the water permeation coefficient of the proton exchange film 82 increases due to the rise of internal temperature, a large amount of water tends to permeate and stay. In other words, it is a state where the water content of the proton exchange film 82 is excessive, and this state is a state where the wet state of the proton exchange film 82 deteriorates. When liquid water (condensed water) stays near the boundary between the anode-side power feeder 83b and the anode electrode catalyst layer 83a, the supply of hydrogen gas from the anode electrode catalyst layer 83a to the anode-side power feeder 83b is hindered, and the voltage between the anode 83 and the cathode 84 can increase under a constant current application.

In the hydrogen compression system 1 according to the present embodiment, the fourth opening/closing part 42 and the fifth opening/closing part 47 are controlled based on the wet state of the proton exchange film 82. As a result, the discharge of hydrogen from the low-pressure side outlet 95 can be regulated by setting the fourth opening/closing part 42 and the fifth opening/closing part 47 to the closed state, so the discharge of hydrogen gas in the low-pressure hydrogen gas flow paths 88 of all the unit cells 81 is regulated. In other words, the flow of hydrogen gas in the low-pressure hydrogen gas flow path 88 can be uniformized between the unit cells 81, and the hydrogen gas and water vapor flowing into the low-pressure hydrogen gas flow paths 88 in all the unit cells 81 can be retained in the low-pressure hydrogen gas flow paths 88. Thus, with the hydrogen compression system 1 according to the present embodiment, it is possible to suppress the occurrence of distribution in the wet state of the proton exchange film 82 and to bring the proton exchange film 82 into a good wet state. Accordingly, the increase in power consumption due to the voltage rise between the anode 83 and the cathode 84 can be suppressed to operate the hydrogen gas compression part 7 with high efficiency.

Further, the control device 9 changes the regulation state of the third decompression part 44 based on the wet state of the proton exchange film 82, and changes the pressure of the hydrogen gas flowing to the side of the low-pressure side outlet 95. Thereby, the relationship between the pressure of the hydrogen gas at the anode 83 and the water content of the proton exchange film 82 can be made appropriate. Accordingly, the proton exchange film 82 can be in a good wet state.

In addition, the control device 9 controls the first opening/closing part 12 and the third opening/closing part 21 based on the wet state of the proton exchange film 82 to switch the flow of hydrogen gas to the branch pipeline 20. As a result, when the water content of the proton exchange film 82 is excessive, dry hydrogen gas can be supplied from the hydrogen supply source 5 to the unit cell 81 to eliminate the state where the water content of the proton exchange film 82 is excessive. Thus, the proton exchange film 82 can be in a good wet state. Accordingly, the increase in power consumption due to the voltage rise between the anode 83 and the cathode 84 can be suppressed to operate the hydrogen gas compression part 7 with high efficiency.

Further, the control device 9 controls the first flow rate adjusting part 15 so that the pressure of the hydrogen gas flowing to the side of the low-pressure side outlet 95 is less than a predetermined value. As a result, it is possible to suppress an excessive supply of hydrogen gas to the anode 83, and to make the relationship between the pressure of the hydrogen gas at the anode 83 and the water content of the proton exchange film 82 appropriate. Accordingly, the proton exchange film 82 can be in a good wet state.

Furthermore, the control device 9 controls the first flow rate adjusting part 15 according to the state in which a current is applied between the anode 83 and the cathode 84. As a result, when the consumption of hydrogen gas at the anode 83 increases or decreases according to the increase or decrease in the applied current, hydrogen gas can be appropriately supplied to the anode 83 to prevent excess or deficiency of hydrogen gas from occurring at the anode 83.

Second Embodiment

Wetness Control Operation

Next, the wetness control operation according to the second embodiment will be described with reference to FIG. 6. In the wetness control operation according to the first embodiment, the wet state of the proton exchange film 82 is determined based on the measured value of the voltmeter 103 of the hydrogen gas compression part 7. On the other hand, the wetness control operation of the second embodiment is different from that of the first embodiment in that the wet state of the proton exchange film 82 is determined based on the measured value of the film resistance meter 101 of the hydrogen gas compression part 7. The configuration other than that described below is the same as that of the first embodiment.

Figure 6:
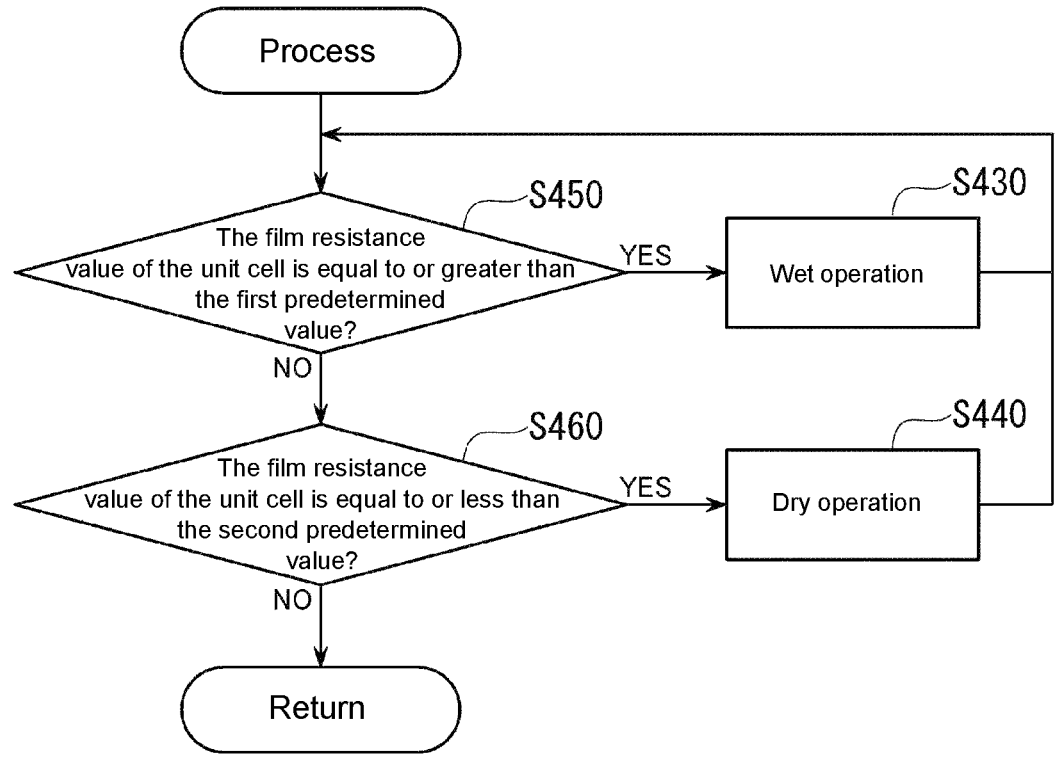
FIG. 6 is a flowchart showing an example of a flow of processing of a wetness control operation executed by an electrochemical hydrogen compression system according to the second embodiment.

FIG. 6 is a flowchart showing an example of the flow of processing of the wetness control operation executed by the hydrogen compression system according to the second embodiment. As shown in FIG. 6, the control device 9 first performs the process of step S450 when performing the wetness control operation. In step S450, the control device 9 acquires the film resistance value of the proton exchange film 82 in each unit cell 81, and determines whether the difference between the film resistance value of the proton exchange film 82 in one unit cell 81 and the film resistance value of the proton exchange film 82 in the other unit cell 81, among the plurality of unit cells 81, is equal to or greater than a first predetermined value. For example, the control device 9 compares the unit cell 81 having the maximum film resistance value of the proton exchange film 82 with the unit cell 81 having the minimum voltage between the anode 83 and the cathode 84. However, the unit cells 81 to be compared are not limited thereto, and two predetermined unit cells 81 may be compared. The first predetermined value may be a predetermined resistance value, or may change depending on the temperature or the like of the unit cell 81. When the difference between the film resistance values is less than the first predetermined value, the processing flow proceeds to the process of step S460. When the difference between the film resistance values is equal to or greater than the first predetermined value, the processing flow proceeds to the process of step S430.

In step S460, the control device 9 determines whether the film resistance value of the proton exchange film 82 in at least one unit cell 81 of the plurality of unit cells 81 is equal to or less than a second predetermined value. That is, the control device 9 determines whether the film resistance value of the unit cell 81 having the minimum film resistance value of the proton exchange film 82, among the plurality of unit cells 81, is equal to or less than the second predetermined value. The second predetermined value may be a predetermined resistance value, or may change depending on the temperature or the like of the unit cell 81. When the film resistance value is greater than the second predetermined value, the processing of the stack wetness control operation is terminated. When the film resistance value is equal to or less than the second predetermined value, the processing flow proceeds to the process of step S440.

As described above, since the wet operation and the dry operation are performed based on the wet state determined by using the film resistance value of the proton exchange film 82 in the present embodiment, the same effects as those of the first embodiment can be achieved.

Third Embodiment

Configuration of Electrochemical Hydrogen Compression System 1A

Figure 7:
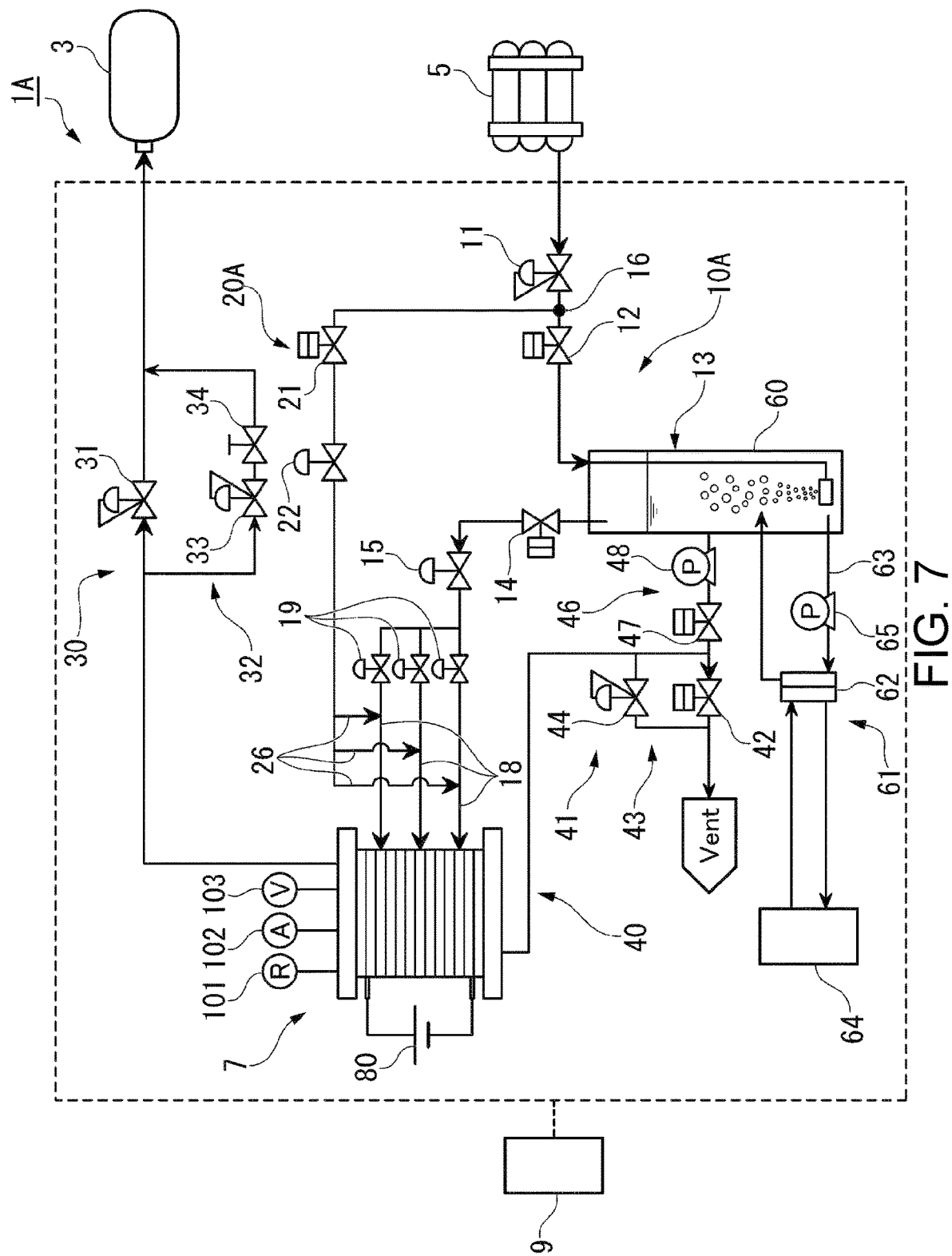
FIG. 7 is a diagram showing a configuration of an electrochemical hydrogen compression system according to the third embodiment.

FIG. 7 is a diagram showing the configuration of the hydrogen compression system according to the third embodiment. The hydrogen compression system 1A of the third embodiment is different from that of the first embodiment in that distribution pipelines 18 are provided in a supply pipeline 10A, and a branch pipeline 20A joins each of the distribution pipelines 18. The configuration other than that described below is the same as that of the first embodiment.

As shown in FIG. 7, the hydrogen compression system 1A includes a plurality of distribution pipelines 18 connected to the hydrogen gas compression part 7. The distribution pipelines 18 are a part of the supply pipeline 10A and branch on the downstream side of the humidifier 13. The distribution pipelines 18 branch from each other on the downstream side of the first flow rate adjusting part 15. The number of the distribution pipelines 18 provided is the same as the number of the regions A and B of the cell unit 71, which will be described later. A second flow rate adjusting part 19 (distribution control valve) is provided in each distribution pipeline 18. The second flow rate adjusting part 19 is a control valve, and adjusts the flow rate of hydrogen gas passing through the second flow rate adjusting part 19 based on control of the control device 9. That is, the second flow rate adjusting part 19 controls the flow rate of hydrogen in each of the distribution pipelines 18.

The branch pipeline 20A branches from the supply pipeline 10A at the branch portion 16 on the upstream side of the humidifier 13. The branch pipeline 20A is provided with a third flow rate adjusting part 22. The third flow rate adjusting part 22 is a control valve, and adjusts the flow rate of hydrogen gas passing through the third flow rate adjusting part 22 based on control of the control device 9. The third flow rate adjusting part 22 is provided on the downstream side of the third opening/closing part 21. The branch pipeline 20A includes a plurality of branches 26 that branch from each other on the downstream side of the third opening/closing part 21 and the third flow rate adjusting part 22. The number of the branches 26 provided is the same as the number of the distribution pipelines 18. The branches 26 are connected to the distribution pipelines 18 on a one-to-one basis. The branches 26 join the distribution pipelines 18 on the downstream side of the second flow rate adjusting part 19.

Figure 8:
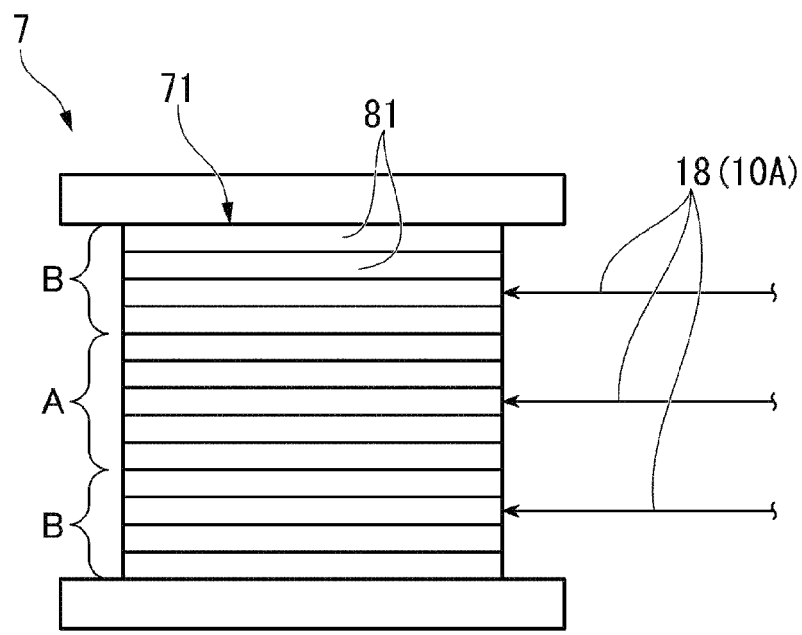
FIG. 8 is a diagram showing connection between a supply pipeline and a hydrogen gas compression part in the electrochemical hydrogen compression system shown in FIG. 7.

FIG. 8 is a diagram showing connection between the supply pipeline and the hydrogen gas compression part in the hydrogen compression system shown in FIG. 7. As shown in FIG. 8, the cell unit 71 of the hydrogen gas compression part 7 has a plurality of regions A and B divided based on the temperature distribution during operation of the hydrogen gas compression part 7. The plurality of regions A and B are arranged in the lamination direction of the unit cells 81. Each of the unit cells 81 included in the cell unit 71 is included in any of the plurality of regions A and B. The plurality of regions A and B are set based on the temperature of the unit cell 81 when the hydrogen gas compression part 7 is operated under predetermined conditions. For example, the plurality of regions A and B are a high temperature region A including the unit cell 81 having a temperature higher than a predetermined temperature, and a low temperature region B including the unit cell 81 having a temperature lower than the predetermined temperature. As described above, the cell unit 71 of the present embodiment can have a high temperature in the intermediate portion in the lamination direction. Therefore, the high temperature region A includes the intermediate portion in the lamination direction of the unit cells 81 in the cell unit 71. Further, the low temperature region B includes two end portions of the cell unit 71 in the lamination direction, and is provided so as to sandwich the high temperature region A in the lamination direction.

The downstream end of each distribution pipeline 18 is connected to one of the plurality of regions A and B of the cell unit 71. Each distribution pipeline 18 communicates with the supply communication hole 91 (see FIG. 3) in each of the regions A and B of the cell unit 71. Each distribution pipeline 18 is capable of supplying hydrogen to the unit cell 81 in the connected region without going through the unit cell 81 in another region. In the present embodiment, the supply communication hole 91 may be blocked from communication between the regions A and B of the cell unit 71. For example, the hydrogen gas compression part 7 includes one inlet 94 (see FIG. 2) to which the downstream end of the distribution pipeline 18 is connected for each of the plurality of regions A and B of the cell unit 71.

Wetness Control Operation

The control method of the hydrogen compression system 1 according to the third embodiment will be described. In the third embodiment, the second flow rate adjusting part 19 is controlled based on the wet state in each of the plurality of regions A and B of the cell unit 71, and the supply amount of water vapor contained in the hydrogen gas supplied to the unit cell 81 of each of the regions A and B is adjusted. For example, the wet state in each of the plurality of regions A and B may be determined based on the measured value of the voltmeter 103 as in the first embodiment, or may be determined based on the measured value of the film resistance meter 101 as in the second embodiment. Further, the control device 9 may determine the wet state of each of the regions A and B based on the measured value of each of the regions A and B, or may determine the wet states of other regions based on the measured values of some of the plurality of regions A and B.

As described above, in the present embodiment, the cell unit 71 has the plurality of regions A and B divided based on the temperature distribution during operation of the hydrogen gas compression part 7, and at least one distribution pipeline 18, which is a part of the supply pipeline 10A, is connected to each of the plurality of regions A and B of the cell unit 71. According to this configuration, where a distribution can be generated in the wet state of the proton exchange film 82 corresponding to the temperature distribution of the cell unit 71, the hydrogen gas supplied to the plurality of regions A and B divided based on the temperature distribution in the cell unit 71 can be separately controlled by the second flow rate adjusting part 19, and therefore it is possible to suppress variations in the wet state in the cell unit 71. Accordingly, the hydrogen gas compression part 7 can be operated with high efficiency.

Furthermore, the branch pipeline 20A joins each of the distribution pipelines 18, and the control device 9 controls the first opening/closing part 12 and the third opening/closing part 21 based on the wet state of the proton exchange film 82 to switch the flow of hydrogen gas to the branch pipeline 20A. Thereby, when the water content of the proton exchange film 82 is excessive, dry hydrogen gas can be supplied from the hydrogen supply source 5 to the unit cell 81 to eliminate the state where the water content of the proton exchange film 82 is excessive. In particular, since the branch 26 of the branch pipeline 20A joins each of the distribution pipelines 18, dry hydrogen gas can be selectively supplied to the region, which includes the unit cells 81 that have an excessive water content, among the regions A and B of the cell unit 71. Thereby, it is possible to suppress an excessive supply of dry hydrogen gas to the unit cell 81 in which the water content in the proton exchange film 82 is not excessive. Thus, the proton exchange film 82 can be kept in a good wet state while variations in the wet state of the proton exchange film 82 are suppressed. Accordingly, the hydrogen gas compression part 7 can be operated with high efficiency.

In the present embodiment, the branch pipeline 20A joins each of the distribution pipelines 18 on the downstream side of the second flow rate adjusting part 19, but the disclosure is not limited to this configuration. That is, the branch pipeline may join the supply pipeline 10A on the upstream side of the second flow rate adjusting part 19.

Fourth Embodiment

Configuration of Electrochemical Hydrogen Compression System 1B

Figure 9:
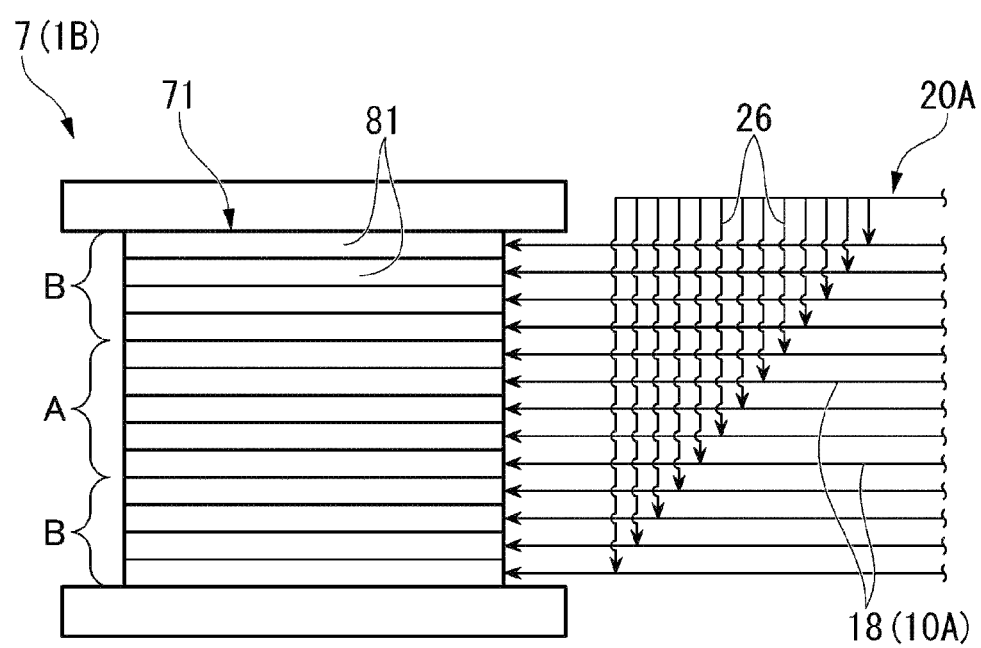
FIG. 9 is a diagram showing connection between a supply pipeline and a hydrogen gas compression part in an electrochemical hydrogen compression system according to the fourth embodiment.

FIG. 9 is a diagram showing connection between the supply pipeline and the hydrogen gas compression part in the hydrogen compression system according to the fourth embodiment. The hydrogen compression system 1B of the fourth embodiment is different from that of the third embodiment in that one distribution pipeline 18 is connected to each unit cell 81. The configuration other than that described below is the same as that of the third embodiment.

As shown in FIG. 9, the number of the distribution pipelines 18 provided is the same as the number of the unit cells 81. The branches 26 of the branch pipeline 20A are connected to the distribution pipelines 18 on a one-to-one basis. The downstream end of one distribution pipeline 18 is connected to each unit cell 81. Each distribution pipeline 18 communicates with the supply communication hole 91 (see FIG. 3) in each unit cell 81. Each distribution pipeline 18 is capable of supplying hydrogen to the connected unit cell 81 without going through another unit cell 81. In the present embodiment, the supply communication hole 91 may be blocked from communication between adjacent unit cells 81. For example, the hydrogen gas compression part 7 includes one inlet 94 (see FIG. 2) to which the downstream end of the distribution pipeline 18 is connected for each of the unit cells 81.

As described above, in the present embodiment, at least one distribution pipeline 18, which is a part of the supply pipeline 10A, is connected to each of the plurality of regions A and B of the cell unit 71. Therefore, the same effects as those of the third embodiment can be achieved.

Furthermore, in the present embodiment, the distribution pipeline 18 is connected to each unit cell 81. According to this configuration, the hydrogen gas supplied to each unit cell 81 can be controlled separately, so that variations in the wet state in the cell unit 71 can be further suppressed.

Accordingly, the hydrogen gas compression part 7 can be operated with high efficiency.

Nevertheless, the disclosure is not limited to the above embodiments described with reference to the drawings, and various modifications can be considered within the technical scope thereof. For example, in the above embodiment, the hydrogen supply source 5 is a curdle in which hydrogen gas is stored. However, the hydrogen supply source is not limited thereto, and may be, for example, a water electrolyzer.

Further, in the above embodiment, the hydrogen gas compression part includes a plurality of unit cells 81, but the number of unit cells 81 is not limited thereto. Even if there is only one unit cell 81, according to the disclosure, the distribution of the wet state in the unit cell 81 can still be eliminated, so the above-mentioned effects can be achieved.

Furthermore, in the first embodiment, in step S410, the control device 9 determines the difference in voltage between the anode 83 and the cathode 84 in a pair of unit cells 81 among the plurality of unit cells 81. However, the control device 9 may determine the voltage in the unit cell 81 having the maximum voltage between the anode 83 and the cathode 84 among the plurality of unit cells 81.

In addition, it is possible to replace the components in the above embodiments with well-known components as appropriate without departing from the spirit of the disclosure, and the above embodiments may be combined as appropriate.

What is claimed is:

1. An electrochemical hydrogen compression system, comprising:
    a hydrogen supply source;
    an electrochemical hydrogen compression device having a unit cell formed by an electrolyte film and an anode and a cathode provided on two surfaces of the electrolyte film, and compressing hydrogen by applying a current between the anode and the cathode; and
    a supply pipeline guiding the hydrogen discharged from the hydrogen supply source to the electrochemical hydrogen compression device,
    wherein the electrochemical hydrogen compression device has:
    an inlet into which the hydrogen supplied from the hydrogen supply source flows;
    an outlet from which unreacted hydrogen of the hydrogen flowing into the inlet is discharged; and
    a cell unit in which the unit cell is laminated,
    and further comprising:
    a power supply supplying the current applied between the anode and the cathode;
    an acquisition part acquiring information related to a wet state of the electrolyte film;
    a regulation part regulating discharge of the hydrogen from the outlet; and
    a control device controlling the regulation part;
    a humidifier provided in the supply pipeline and humidifying the hydrogen flowing through the supply pipeline;
    a distribution pipeline being a part of the supply pipeline and branching on a downstream side of the humidifier and connected to the electrochemical hydrogen compression device; and
    a distribution control valve controlling a flow rate of the hydrogen in each distribution pipeline,
    wherein the cell unit comprises a plurality of regions divided based on a temperature distribution during an operation of the electrochemical hydrogen compression device, and
    at least one distribution pipeline is connected to each of the plurality of regions of the cell unit, and
    wherein the control device controls the regulation part based on at least the wet state.

2. The electrochemical hydrogen compression system according to claim 1, wherein the distribution pipeline is connected to each unit cell.

3. The electrochemical hydrogen compression system according to claim 2, further comprising:
    a branch pipeline branching from the supply pipeline on an upstream side of the humidifier; and
    a switching part switching flow of the hydrogen to the branch pipeline,
    wherein the branch pipeline joins each distribution pipeline, and
    the control device controls the switching part based on the wet state.

4. The electrochemical hydrogen compression system according to claim 2, further comprising:
    a control valve provided in the supply pipeline and controlling a flow rate of the hydrogen discharged from the hydrogen supply source,
    wherein the control device controls the control valve so that the pressure of the hydrogen flowing to the outlet side is less than a predetermined value.

5. The electrochemical hydrogen compression system according to claim 1, further comprising:
    a branch pipeline branching from the supply pipeline on an upstream side of the humidifier; and
    a switching part switching flow of the hydrogen to the branch pipeline,
    wherein the branch pipeline joins each distribution pipeline, and
    the control device controls the switching part based on the wet state.

6. The electrochemical hydrogen compression system according to claim 5, further comprising:
    a control valve provided in the supply pipeline and controlling a flow rate of the hydrogen discharged from the hydrogen supply source,
    wherein the control device controls the control valve so that the pressure of the hydrogen flowing to the outlet side is less than a predetermined value.

7. The electrochemical hydrogen compression system according to claim 1, further comprising:
    a control valve provided in the supply pipeline and controlling a flow rate of the hydrogen discharged from the hydrogen supply source,
    wherein the control device controls the control valve so that the pressure of the hydrogen flowing to the outlet side is less than a predetermined value.

8. The electrochemical hydrogen compression system according to claim 1, further comprising:
    a control valve provided in the supply pipeline and controlling a flow rate of the hydrogen discharged from the hydrogen supply source,
    wherein the control device controls the control valve according to a state of applying the current between the anode and the cathode.

9. The electrochemical hydrogen compression system according to claim 1, wherein the control device changes a regulation state of the regulation part based on the wet state, and changes a pressure of the hydrogen flowing to an outlet side.

10. The electrochemical hydrogen compression system according to claim 9, further comprising:

a branch pipeline branching from the supply pipeline on an upstream side of the humidifier and joining the supply pipeline on a downstream side of the humidifier; and a switching part switching flow of the hydrogen to the branch pipeline, wherein the control device controls the switching part based on the wet state.

11. The electrochemical hydrogen compression system according to claim 9, wherein the distribution pipeline is connected to each unit cell.

12. The electrochemical hydrogen compression system according to claim 9, further comprising:

a branch pipeline branching from the supply pipeline on an upstream side of the humidifier; and a switching part switching flow of the hydrogen to the branch pipeline, wherein the branch pipeline joins each distribution pipeline, and the control device controls the switching part based on the wet state.

13. The electrochemical hydrogen compression system according to claim 11, further comprising:

a branch pipeline branching from the supply pipeline on an upstream side of the humidifier; and a switching part switching flow of the hydrogen to the branch pipeline, wherein the branch pipeline joins each distribution pipeline, and the control device controls the switching part based on the wet state.

14. The electrochemical hydrogen compression system according to claim 9, further comprising:

a control valve provided in the supply pipeline and controlling a flow rate of the hydrogen discharged from the hydrogen supply source, wherein the control device controls the control valve so that the pressure of the hydrogen flowing to the outlet side is less than a predetermined value.

15. The electrochemical hydrogen compression system according to claim 9, further comprising:

a control valve provided in the supply pipeline and controlling a flow rate of the hydrogen discharged from the hydrogen supply source, wherein the control device controls the control valve according to a state of applying the current between the anode and the cathode.

16. The electrochemical hydrogen compression system according to claim 1, further comprising:

a branch pipeline branching from the supply pipeline on an upstream side of the humidifier and joining the supply pipeline on a downstream side of the humidifier; and a switching part switching flow of the hydrogen to the branch pipeline, wherein the control device controls the switching part based on the wet state.

17. The electrochemical hydrogen compression system according to claim 16, further comprising:

a control valve provided in the supply pipeline and controlling a flow rate of the hydrogen discharged from the hydrogen supply source, wherein the control device controls the control valve so that the pressure of the hydrogen flowing to the outlet side is less than a predetermined value.

* * * * *